United States Patent [19]

Morimoto

[11] Patent Number: 5,698,921
[45] Date of Patent: Dec. 16, 1997

[54] PERMANENT MAGNET TYPE MOTOR

[75] Inventor: Yoshihiro Morimoto, Tokyo, Japan

[73] Assignee: Mitsubishi Denki Kabushiki Kaisha, Tokyo, Japan

[21] Appl. No.: 607,360

[22] Filed: Feb. 27, 1996

[30] Foreign Application Priority Data

Sep. 22, 1995 [JP] Japan .................. 7-244241

[51] Int. Cl.$^6$ .................................. H02K 21/26
[52] U.S. Cl. ............. 310/154; 310/156; 310/67 R; 310/248
[58] Field of Search .................. 310/154, 248, 310/152, 156, 67 R, 58

[56] References Cited

U.S. PATENT DOCUMENTS

| | | | |
|---|---|---|---|
| 4,447,751 | 5/1984 | Ban et al. | 310/154 |
| 4,510,407 | 4/1985 | Tomite | 310/154 |
| 5,128,577 | 7/1992 | Kobayashi | 310/233 |
| 5,233,250 | 8/1993 | DeFilippis | 310/156 |
| 5,331,245 | 7/1994 | Burgbacher et al. | 310/186 |
| 5,548,171 | 8/1996 | Ogawa et al. | 310/154 |

FOREIGN PATENT DOCUMENTS

| | | |
|---|---|---|
| 58143482 | 9/1983 | Japan . |
| 58143481 | 9/1983 | Japan . |
| 517783 | 3/1993 | Japan . |

*Primary Examiner*—Steven L. Stephan
*Assistant Examiner*—Tomothy A. Williams
*Attorney, Agent, or Firm*—Sughrue, Mion, Zinn, Macpeak & Seas, PLLC

[57] ABSTRACT

A permanent magnet type motor comprising:

a field magnet including permanent magnet arranged inside a yoke in an 8-pole structure; and an armature including an armature coil and armature core, the armature coil and the armature core arranged inside the field magnet through an air gap;

wherein the field magnet has a pole arc set in a range from 31° to 37°, and wherein the length (lm) of main poles in an axial direction is set with respect to the length (Lc) of the armature core in the axial direction so as to satisfy the inequality of $1.0 < Lm/Lc < 1.4$.

6 Claims, 6 Drawing Sheets

T/C: ratio wherein torque/cost is 1 when Lm/Lc = 1
T/W: ratio wherein torque/motor weight is 1 when Lm/Lc = 1

—— torque/cost
---- torque/motor weight

Lm: axial length of permanent magnets
Lc: axial length of armature core

PERMANENT MAGNET TYPE MOTOR

BACK GROUND OF THE INVENTION

1. Filed of the Invention

The present invention relates to a permanent magnet type motor which is used in e.g. starting an internal combustion engine.

2. Discussion of Background

In FIG. 7, there is shown a sectional view of a magnetic path of a conventional permanent magnet type motor in a direction perpendicular to an axial direction. In FIG. 8, there is shown a plan view of a brush holder having a brush arrangement, which is used in the permanent magnet type motor shown in FIG. 7, and which has been disclosed in e.g. JP-U-58143482.

In those Figures, reference numeral 1 designates a field magnet which is constituted by a yoke 1a, main poles 1b held to an inner surface of the yoke 1a and made of a permanent magnet, and auxiliary poles 1c arranged adjacent to the respective main poles 1b and made of a soft magnetic material. The field magnet 1 has a six-pole structure, and the pole arc which is defined by the inner peripheral surfaces of a main pole 1b and an auxiliary pole 1c is set to about 45°. Reference numeral 2 designates an armature which is constituted by an armature core 2a arranged along an inner peripheral surface of the field magnet 1 and forming a magnetic path, and armature coils 2b wound in slots in the armature core 2a. Reference numeral 3a designates brushes which are arranged and fixed on a base plate 3b. The brushes 3a are connected to an external power source (not shown) through pigtails 3c, and are pressed against a commutator (not shown) by brush springs 3d.

In the permanent magnet type motor thus constructed, the output torque from the motor is proportional to a value of current in the armature coils 2b, and to a total amount of magnetic fluxes which link the armature coils 2b. In addition, in order to improve the durability of the brushes, it is effective to set the magnetical neutral point among the poles to occupy a wide range of area. For example, motors which are used for e.g. starting an internal combustion engine are required to output a great deal of torque in particular at starting. For the purpose, it is common that the field magnet has a 4-pole structure or a 6-pole structure as shown in FIG. 7 not only to increase the amount of magnetic fluxes for every hole but also to have the magnetical neutral point occupied in a wide range of area to some degree, thereby improving starting torque and lengthening the life of the brushes. The brushes have such a structure that a plurality of positive brushes and a plurality of negative brushes are provided as shown in FIG. 8 and disclosed in JP-U-58143482 to decrease electric current loads on the brushes.

Electrical machines and apparatus are always required to be miniaturized, and miniaturization of such permanent magnet type d.c. motors creates the following problems:

The thickness of the permanent magnets forming the field magnet is determined to have a size required for not only obtaining a required amount of magnetic fluxes but also avoiding demagnetization due to armature reaction. A demagnetization field Ha which is applied to a permanent magnet having a unit length due to armature reaction is expressed by the following equation wherein Ia is armature current, Z is the number of coils, α is an angle of pole arc, dm is the thickness of a magnet, lg is the length of an air gap and k is coefficient:

$$Ha = k \times Ia \times Z \times \alpha/(dm + lg) \qquad (1)$$

Since the "α" in the equation (1) indicates an angle of pole arc needed for obtaining magnetic fluxes, the multiplication "α×Ia" indicates a value needed for obtaining torque. In order to minimize the demagnetizing field Ha while obtaining required torque and to avoid demagnetization due to armature reaction, the thickness dm of the magnet is required to have a size that is balanced against the angle α of pole arc and the armature current Ia, which means that it is extremely difficult to establish miniaturization at the field magnet side. In addition, it is also extremely difficult to decrease the thickness of the yoke 1a because the yoke 1a has magnetic fluxes passed therethrough in an amount of almost magnetic saturation by the field magnet, and because the decreased thickness of the yoke leads to a drop in magnetic fluxes due to a decrease in the sectial area of the yoke.

It is an object of the present invention to solve those problems, and to set the number of poles in a field magnet, the angle of pole arc and the thickness of magnets at optimum values to realize compact and lightweight design in a permanent magnetic type motor without decreasing the total amount of magnetic fluxes supplied to an armature core, i.e. without decreasing output torque.

SUMMARY OF THE INVENTION

The present invention to provide a permanent magnet type motor comprising a field magnet including permanent magnets arranged inside of a yoke in an 8-pole structure; and an armature including an armature coil and an armature core, the armature coil and an armature core arranged inside of the field magnet through an air gap; wherein the field magnet has a pole arc set in a range from 31° to 37°, and wherein the length (Lm) of main poles in an axial direction is set with respect to the length (Lc) of the armature core in the axial direction so as to satisfy the inequality of $1.0 < Lm/Lc < 1.4$.

The present invention further provides a permanent magnet type motor comprising a field magnet including permanent magnets arranged inside of a yoke in an 8-pole structure; an armature including an armature coil formed in wave winding and an armature core, which are arranged inside of the field magnet through an air gap; and brushes wherein two positive brushes are arranged so as to be apart from each other at an angle of an integral multiple of the pole pitch and wherein one negative brush is arranged or two negative brushes are arranged so as to be apart from each other at an angle of an integral multiple of the pole pitch.

It is preferable that the field magnet includes main poles made of a permanent magnet, and auxiliary poles made of a soft magnetic material, and that the auxiliary poles are arranged adjacent to the respective associated main poles.

The torque of such a permanent magnet type motor is proportional to current in the armature coil and to the amount of magnetic fluxes linking the armature coil, and is expressed the following equation wherein Φ is an amount of magnetic fluxes per pole, Ia is armature current, P is the number of poles, Z is the total number of conductors and a is the number of parallel circuits of armature coils:

$$T = \Phi \times Ia \times P \times Z / 2\pi a \qquad (2)$$

The number P of the field poles can be increased to 8 to ensure a required total amount of magnetic fluxes, P×Φ, so as to prevent the torque T from lowering even if the magnetic fluxes Φ per pole is decreased. In the 8-pole structure, as shown in FIG. 5, the output torque of the motor reaches the maximum value when the pole arc defined by a main pole and an auxiliary pole has an angle of 34°, and sufficient torque can be obtained in the range of from 31° to 37° as the angles of pole arc. By such an arrangement, the pole arc angle α in the equation (1) is decreased, the thickness dm of a permanent magnet which is required to unify demagnetizing field Ha applied to the magnet per a unit length can be decreased, and the decreased magnetic fluxes Φ per pole can make the yoke thin-walled, realizing miniaturization of the motor.

Although as described in JP-B-517783, the torque of motors reaches the maximum value when the axial length of Lm of main poles is 1.4 times the axial length Lc of the armature core, there is no significant difference in characteristics when Lm/Lc is from 1.0 to 1.6 as shown in FIG. 6. It means that Lm/Lc can be chosen to be a value of from 1.0 to 1.4 to realize miniaturization while obtaining sufficient torque.

When an armature coil is wound in wave winding, and, as disclosed in JP-U-58143482, a couple of positive brushes and a couple of negative brushes are arranged symmetrically, or when the number of a negative brush is made smaller than the number of the positive brushes to lower to 1 as shown in JP-U-58143418, the occupied area of the brush arrangement can be decreased, and miniaturization of the motor can be obtained by being combined with the improvement in the magnetic circuit as stated above.

As explained, the present invention can decrease the thickness of the main poles without lowering the total amount of magnetic fluxes. The present invention can also make the yoke thin-walled by decreasing the amount of magnetic fluxes per pole to lower the amount of magnetic fluxes in the yoke. As a result, compact and lightweight design can be realized in permanent magnet type motors without lowering output characteristics and demagnetizing resistant amount due to armature reaction, thereby decreasing production cost. In addition, the ratio of the axial length of main poles to the axial length of the armature core can be set in the specified range, or the number of the brushes can be set to the lowest and sufficient one to obtain a small sized permanent magnet type motor having high performance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiment 1

Figure 1:
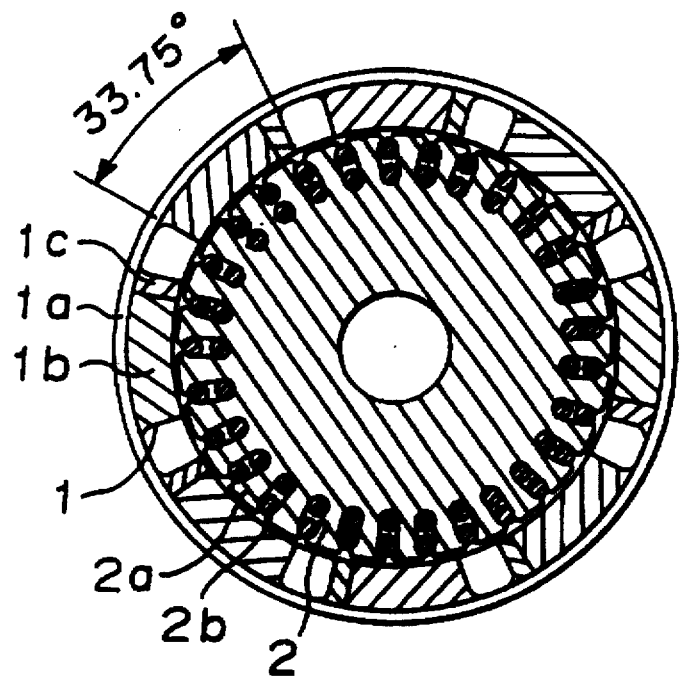
FIGS. 1(a) and (b) are a cross sectional view of the permanent magnet type motor according to a first embodiment of the present invention, in a direction perpendicular to the axial direction of the motor, and a cross sectional view of the motor in the axial direction, respectively.
Figure 1:
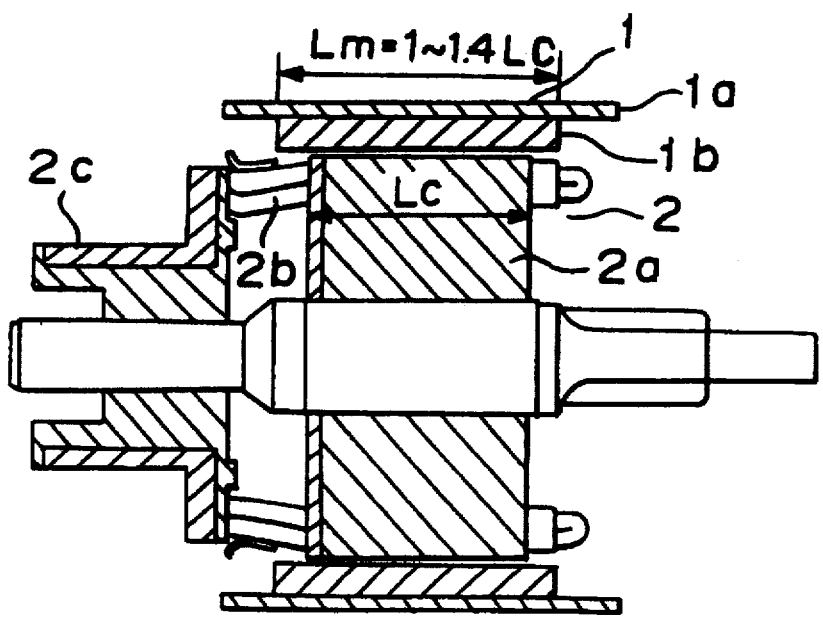

In FIGS. 1(a) and (b), there is shown the permanent magnet type motor according to a first embodiment of the present invention. FIG. 1(a) is a cross sectional view of the motor in a direction perpendicular to the axial direction of the motor. FIG. 1(b) is an axial cross sectional view. In those Figures, parts which correspond to or identical to parts in the conventional device are indicated by the same reference numerals as the conventional one. As shown in those Figures, a field magnet 1 has an 8-pole structure wherein the pole arc angle defined by a main pole 1b and its auxiliary pole 1c is set to 33.75°. An armature 2 is constituted by a armature core 2a, armature coils 2b and a commutator 2c. As shown in FIG. 1(b), the main poles 1b are formed to be longer than the armature core 2a in the axial direction so that Lm/Lc is set to be a value of from 1.0 to 1.4.

In the permanent type motor constructed as stated above, the pole arc angle can be reduced in comparison with the conventional permanent magnet type motor, and can avoid demagnetization due to armature reaction even if the thickness of the magnets is reduced. As a result, miniaturization of the motor can be realized. Although the amount of magnetic fluxes per pole is decreased, not only an increase in the number of poles can prevent the total amount of magnetic fluxes from decreasing to maintain required motor characteristics but also the decreased amount of the magnetic fluxes per pole can lower the magnetic flux density of a yoke 1a to realize compact and lightweight design in the motor by decreasing the sectional area of the yoke 1a. Although it is possible that in accordance with the present invention the range of a magnetical neutral point is narrowered to deteriorate commutation so as to have an adverse effect on the life of brushes, even the arrangement by the present invention can ensure the life of brushes which is at least the same as the conventional permanent magnet type motor because the quality of brush materials has been improved.

Embodiment 2

Figure 2:
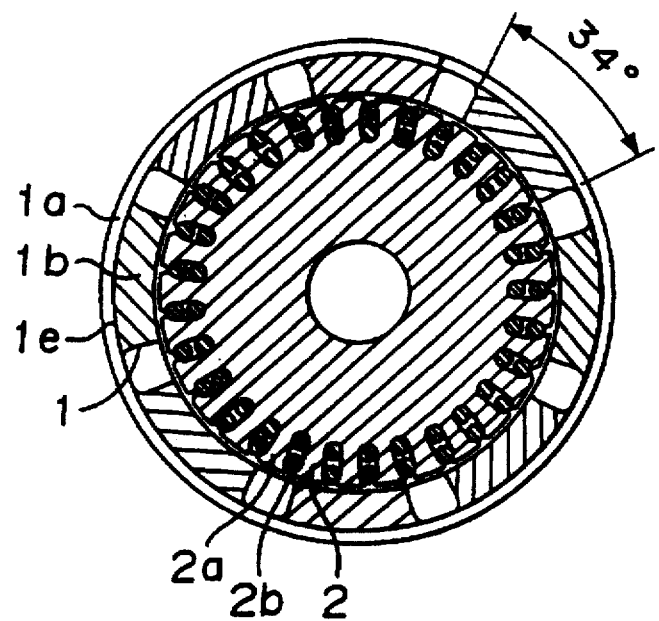
FIG. 2 is a cross sectional view of the permanent magnet type motor according to a second embodiment of the present invention, in a direction perpendicular to the axial direction of the motor

In FIG. 2, there is shown the motor according to a second embodiment of the present invention. In this embodiment, a field magnet 1 constituted by only main poles 1b which are made of permanent magnets attached on an inner surface 1e of a yoke 1a. The permanent magnet type motor which uses no auxiliary poles as stated just now can also adopt the same structure as the first embodiment in terms of the number of poles, the pole arc angle and the ratio of the length of the main poles to the length of armature core to realize compact and lightweight design in the motor without lowering characteristics in comparison with the conventional same type of motor.

Embodiment 3

Figure 3:
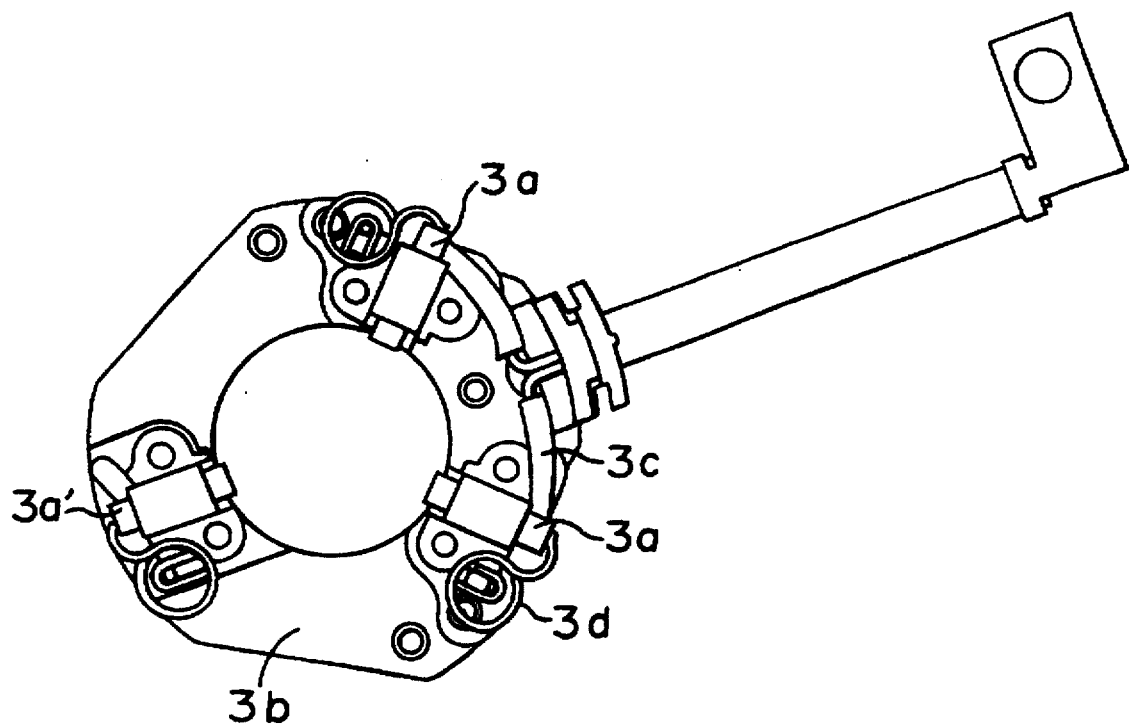
FIG. 3 is a plan view showing a brush arrangement according to a third embodiment of the present invention, as viewed from an armature side.
Figure 4:
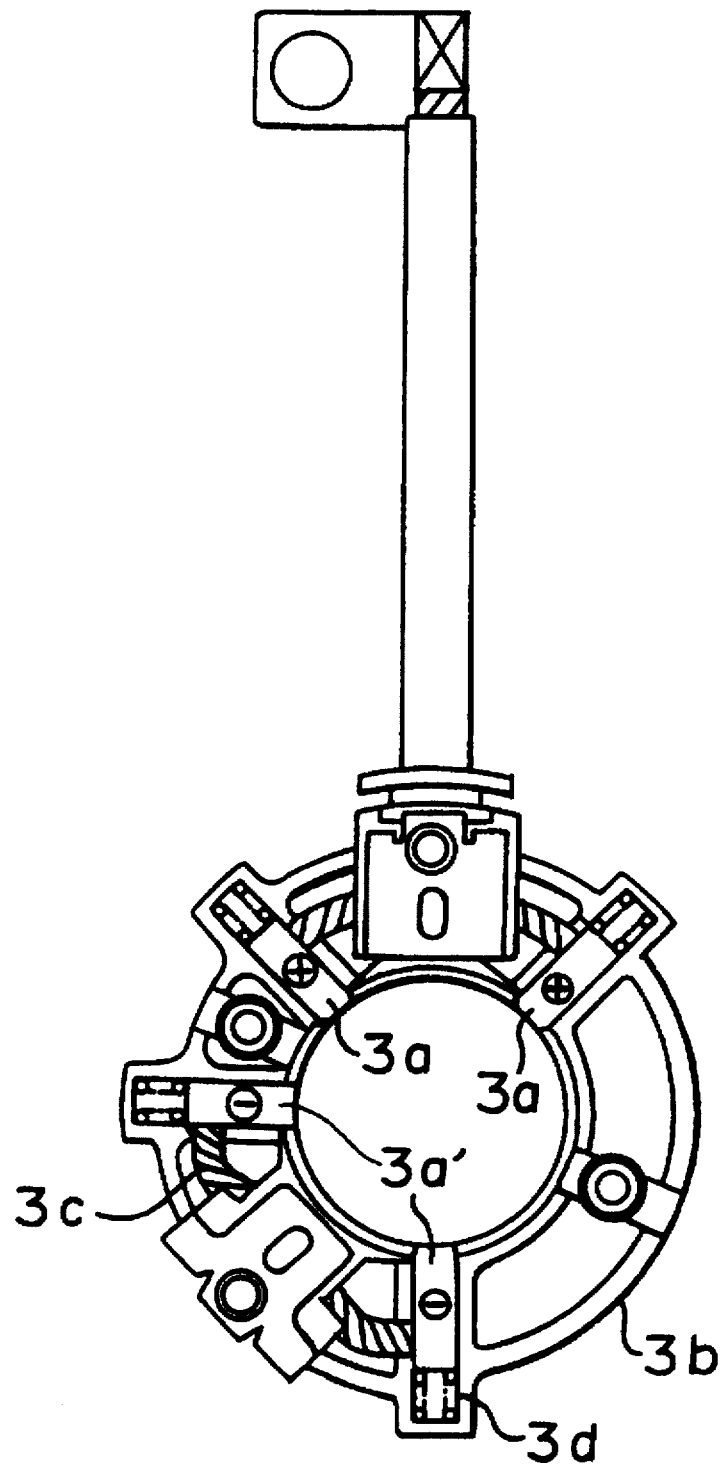
FIG. 4 is a plan view showing another brush arrangement according to the third embodiment of the present invention, as viewed from a side opposite to the armature side.
Figure 5:
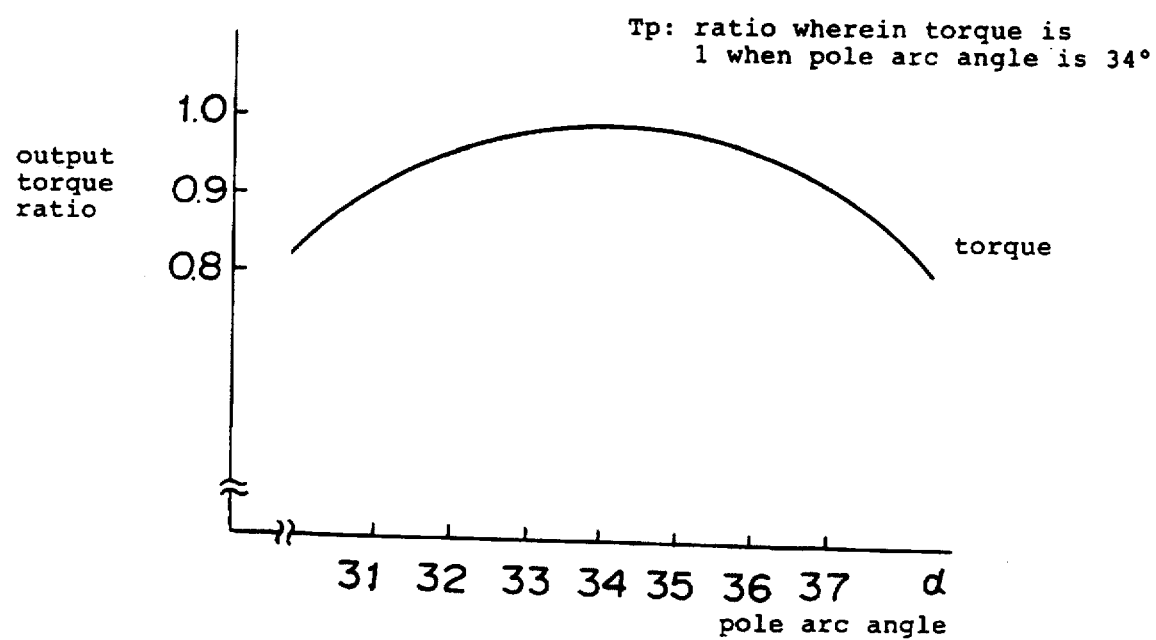
FIG. 5 is a graph to help explain characteristics with respect to pole arc angles according to the present invention.
Figure 6:
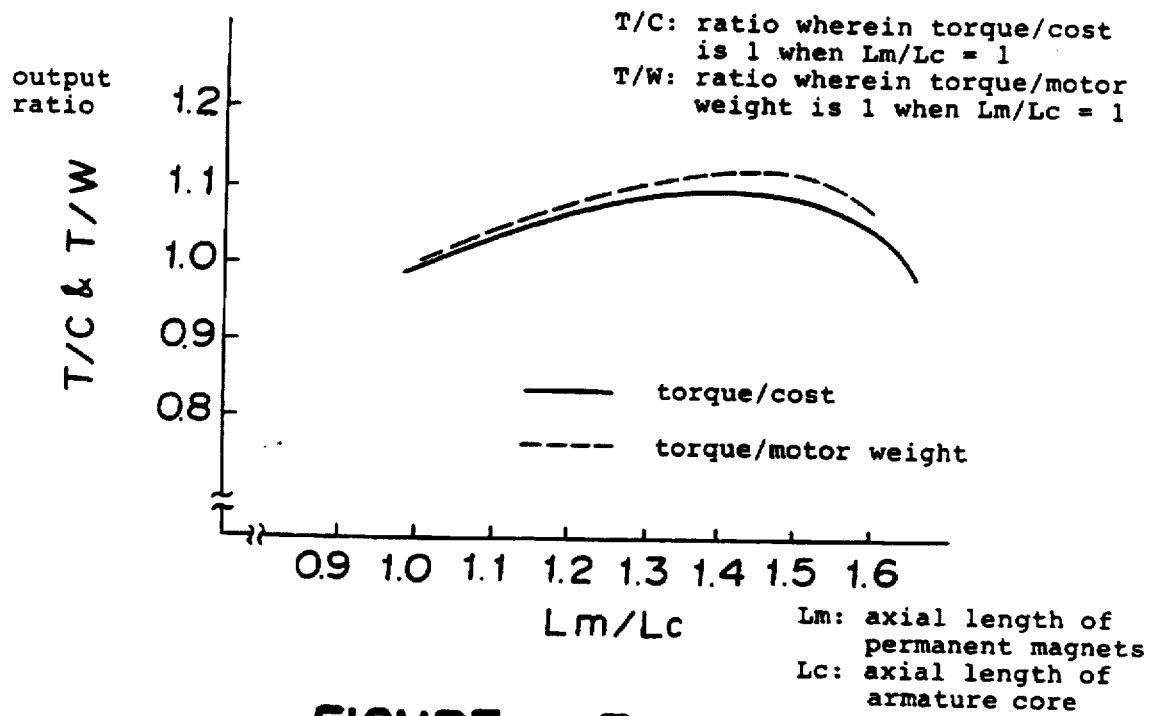
FIG. 6 is a graph to help explain characteristics with respect to the length of main poles and the length of an armature according to the present invention.
Figure 7:
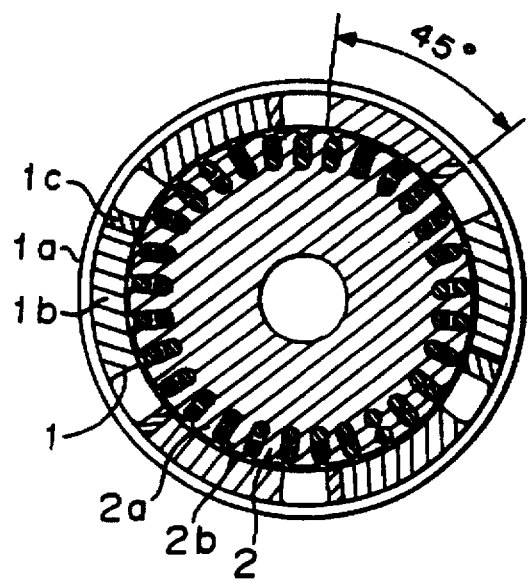
FIG. 7 is a cross sectional view of a conventional permanent magnet type motor, in a direction perpendicular to the axial direction of the motor.
Figure 8:
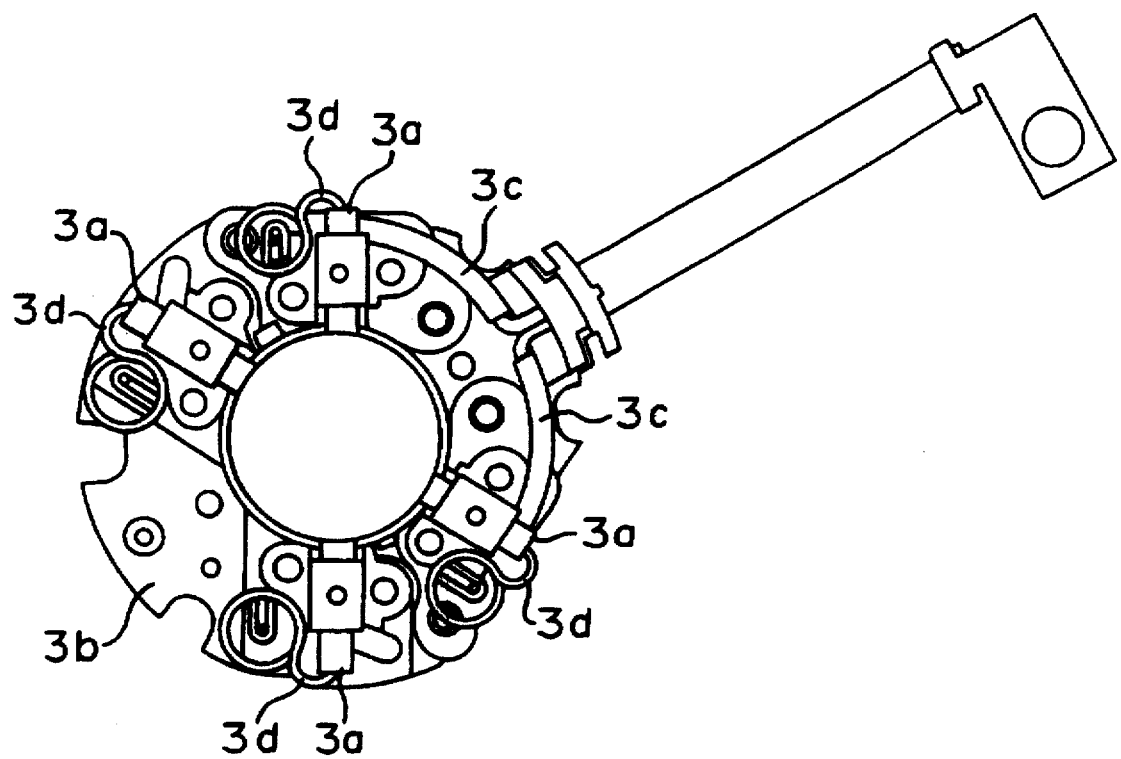
FIG. 8 is a plan view of a brush arrangement of the conventional permanent magnet type motor.

In FIGS. 3 and 4, there are shown brush arrangements which can be applied to the present invention. In those Figures, parts which are identical to or correspond to the parts of the device shown in the FIG. 8 are indicated by the same Reference numerals as the parts of the device shown in FIG. 8. In FIG. 3, there is shown an example wherein two positive brushes 3a which are subjected to hard abrasion due to electric energization are provided to decrease a burden of current and a single negative brush 3a' which is subjected to small abrasion due to electric energization is provided. In FIG. 4, there is another example wherein a couple of positive brushes 3a and a couple of negative brushes 3a' are provided. The decreased number of the brushes can make efficient use of the spaces between adjoining brushes, and house the brushes in a space of the cross section of a miniaturized magnetic circuit.

Obviously, numerous modifications and variations of the present invention are possible in light of the above teachings. It is therefore to be understood that within the scope of the appended claims, the invention may be practiced otherwise than as specifically described herein.

What is claimed is:

1. A permanent magnet type motor comprising:
   a field magnet including permanent magnets arranged inside a yoke in an 8-pole structure; and
   an armature including an armature coil and armature core, the armature coil and the armature core arranged inside the field magnet through an air gap;
   wherein the field magnet has a pole arc set in a range from 31° to 37°, and wherein the length (Lm) of main poles in an axial direction is set with respect to the length (Lc) of the armature core in the axial direction so as to satisfy the inequality of $1.0 < Lm/Lc < 1.4$.

2. A permanent magnet type motor comprising:
   a field magnet including permanent magnets arranged inside a yoke in an 8-pole structure;
   an armature including an armature coil formed in wave winding and an armature core, which are arranged inside of the field magnet through an air gap; and
   brushes, including two positive brushes and a single negative brush, wherein the two positive brushes are arranged so as to be apart from each other at an angle of a positive integral multiple of the pole pitch.

3. A permanent magnet type motor according to claim 1, wherein the field magnet includes main poles made of a permanent magnet, and auxiliary poles made of a soft magnetic material, the auxiliary poles arranged adjacent to the respective associated main poles.

4. A permanent magnet type motor according to claim 2, wherein the field magnet includes main poles made of a permanent magnet, and auxiliary poles made of a soft magnetic material, the auxiliary poles arranged adjacent to the respective associated main poles.

5. The permanent magnet type motor according to claim 1, further comprising brushes, including at least two positive brushes and a single negative brush, wherein said positive brushes are arranged so as to be apart from each other at an angle of a positive integral multiple of the pole pitch.

6. The permanent magnet type motor according to claim 1, further comprising brushes, including at least two positive brushes and at least two negative brushes, wherein said positive brushes are arranged so as to be apart from each other at an angle of a positive integral multiple of the pole pitch, and said negative brushes are arranged so as to be apart from each other at an angle of a positive integral multiple of the pole pitch.

* * * * *